(No Model.)
J. GOWDEY.
TRICYCLE.
No. 300,359. Patented June 17, 1884.
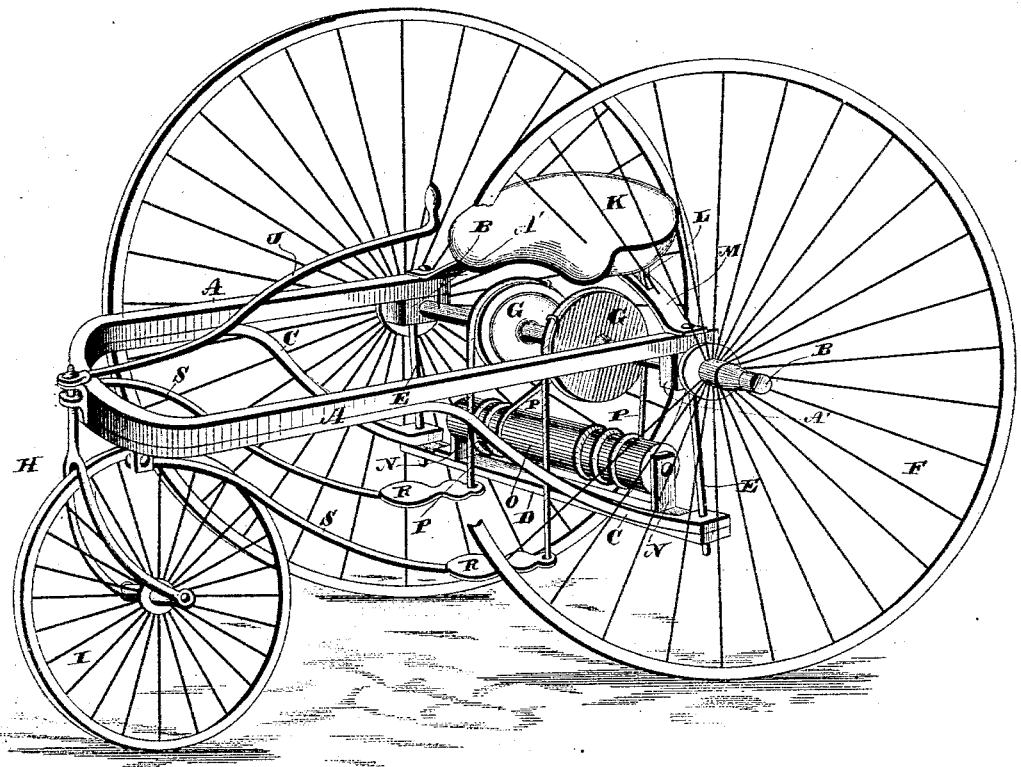
WITNESSES
E. Nottingham
George Cook.
INVENTOR
John Gowdey.
By H. A. Supmom.
Attorney

UNITED STATES PATENT OFFICE.

JOHN GOWDEY, OF JANESVILLE, WISCONSIN.

TRICYCLE.

SPECIFICATION forming part of Letters Patent No. 300,359, dated June 17, 1884.

Application filed April 9, 1884. (No model.)

*To all whom it may concern:*

Be it known that I, JOHN GOWDEY, of Janesville, in the county of Rock and State of Wisconsin, have invented certain new and useful Improvements in Tricycles; and I do hereby declare the following to be a full, clear, and exact description of the invention, such as will enable others skilled in the art to which it appertains to make and use the same.

My invention relates to an improvement in tricycles, the object being to provided a device of this character which shall be simple and economical in construction and at the same time durable and efficient in use; and with these ends in view my invention consists in certain novel features of construction and combinations of parts, as will be hereinafter described, and pointed out in the claims.

The accompanying drawing represents a view in perspective of a machine embodying my improvement.

The frame of my improved machine consists of a yoke or U-shaped bar, A, the two boxes A' bolted to the under side of this yoke, of the curved bar C, placed under and secured to the bar A, the said bar C being bent around to conform to the curve of the front portion of the bar A, and having its ends bent down and connected by a cross-bar, D, and braced by the vertical rods E, the upper ends of which are secured to the rear ends of the bar A and boxes A'.

To the axle B are secured the wheels F, preferably by friction-clutches, and also the pulleys or drums G, secured to the axle by clutches, adapted when they are turned forward to turn the axle and wheels secured thereon, and when turned in the opposite direction allow the axle to remain stationary.

To the forward curved end of the frame-piece A is pivotally secured the fork H, in which is secured the front steering-wheel, I, to the upper end of which fork is rigidly secured the steering-bar J, extending within easy reach of the operator, who occupies the seat K, secured to a spring, L, fastened to a bow, M, which latter is secured to the bar A near its rear ends. To the cross-piece D of the frame are secured the uprights or bearings N, in which is journaled the axle of the roller O, situated below the axle B.

To opposite sides of the roller O are secured the ends of the ropes P, which are preferably wrapped around the said roller a few times. By securing the ropes to opposite sides of the roller, one of them, when the roller is turned, will wind the latter around while the other unwinds. These ropes pass from the roller around the pulleys G and down to the rear ends of the pedals R, which are secured to the lower ends of the bars S, the upper ends of which latter are pivotally secured to the forward curved end of the bar A. It will now be readily seen that when the operator presses one pedal down, the corresponding pulley will be turned in a forward direction, thereby turning the axle and propelling the machine in a like direction, the rear end of the rope P at the same time turning the roller allowing the said rope to unwind as the pedal is forced downwardly, which winds the opposite rope around the roller, and thereby raises the opposite pedal, the clutch allowing the pulley G to be turned backward without interfering with the forwardly-turning axle. By this means of propulsion continuous power on the drive-wheels is secured which can not be had with crank-pedals. The vehicle may be made for one person, or by adding two more pedals and pulleys can be used by two persons.

My invention is exceedingly simple in construction, is of few parts, and can be manufactured at a small initial cost.

I would have it understood that I do not limit myself to the exact construction and arrangement of parts shown and described, but consider myself at liberty to make such changes and alterations as fairly fall within the spirit and scope of my invention.

Having fully described my invention, what I claim as new, and desire to secure by Letters Patent, is—

1. The combination, with the curved yoke, constructed substantially as described, having bearings or boxes secured thereto at its free ends, an axle journaled in said boxes, wheels secured to the axle, and pulleys connected to said axle by friction-clutches, of a cross-bar suspended below the axle by the rods and bar, as described, a roller journaled in bearings in said cross-bar, ropes secured to said roller and passing up over the pulleys, and pedallevers, the front ends of which are secured to the curved portion of the yoke, while their rear ends are secured to the free ends of the ropes.

2. A tricycle consisting, essentially, of the curved U-shaped yoke, the axle journaled thereto, wheels secured to the axle, the steering-wheel, the pulleys, the cross-bar suspended below the axle in the manner described, the roller journaled in bearings on said cross-bar, the pedals, and ropes connecting the roller and pedals, all of the above parts constructed and combined substantially as and for the purpose set forth.

In testimony whereof I have signed this specification in the presence of two subscribing witnesses.

JOHN GOWDEY.

Witnesses:
SAML. A. GOWDEY,
JUDE H. BALCH.